Aug. 30, 1960  R. W. WILSON  2,950,770
PRESS WHEEL ASSEMBLY FOR PLANTING IMPLEMENTS
Filed Feb. 24, 1958

INVENTOR
ROBERT W. WILSON

BY *Cushman, Darby & Cushman*
ATTORNEY

United States Patent Office 2,950,770
Patented Aug. 30, 1960

2,950,770

PRESS WHEEL ASSEMBLY FOR PLANTING IMPLEMENTS

Robert W. Wilson, Charlotte, N.C., assignor to R. H. Bouligny, Inc., Charlotte, N.C., a corporation of North Carolina Filed Feb. 24, 1958, Ser. No. 717,148

1 Claim. (Cl. 172—538)

This invention relates to agricultural implements and more particularly to improvements in agricultural implements such as transplanters, planters and the like.

Agricultural implements such as transplanters, planters and the like are usually supported for movement over the ground by a pair of wheels which also serve to pack the soil around the plants or seeds deposited in the ground during the movement of the implement. A simple rigid rimmed wheel such as now utilized on most commercial implements of this type does not always work to best advantage due to variance in soil conditions. With such wheels the ground contact area is constant and the load on the wheels is generally constant so that the resulting force per unit area applied by the wheels is also generally constant. Thus, while this force per unit area may be highly desirable for one type of soil condition, in another, excessive sinking of the wheels will occur resulting in the soil being squeezed out on both sides of the wheel and hence poor plant setting. Moreover, in most implements of the transplanter type, the wheels act as a driving means for the transplanter mechanism so that the proper setting of the plants is dependent upon the wheels maintaining proper traction with the ground. Again, with the wheels applying a constant force per unit area, differing soil conditions may have the effect of disturbing the tractive qualities of the wheels so that inaccurate plant setting will result.

An object of the present invention is the provision of an agricultural implement of the type described having improved wheel means in which the ground contact area thereof may be readily varied to accommodate varied soil conditions so as to insure proper buoyancy and traction of the wheel means on the soil and proper packing of the soil by the wheel means thereby eliminating poor and inaccurate plant setting and the like.

Another object of the present invention is the provision of a wheel means for an agricultural implement of the type described having improved means for varying the ground contact area thereof to suit the soil conditions.

Still another object of the present invention is the provision of a wheel means for an agricultural implement of the type described which is simple in construction, easy to operate and economical to manufacture.

These and other objects of the present invention will become more apparent during the course of the following detailed description and appended claim.

The invention may best be understood with reference to the accompanying drawings wherein an illustrative embodiment is shown.

Figure 1:
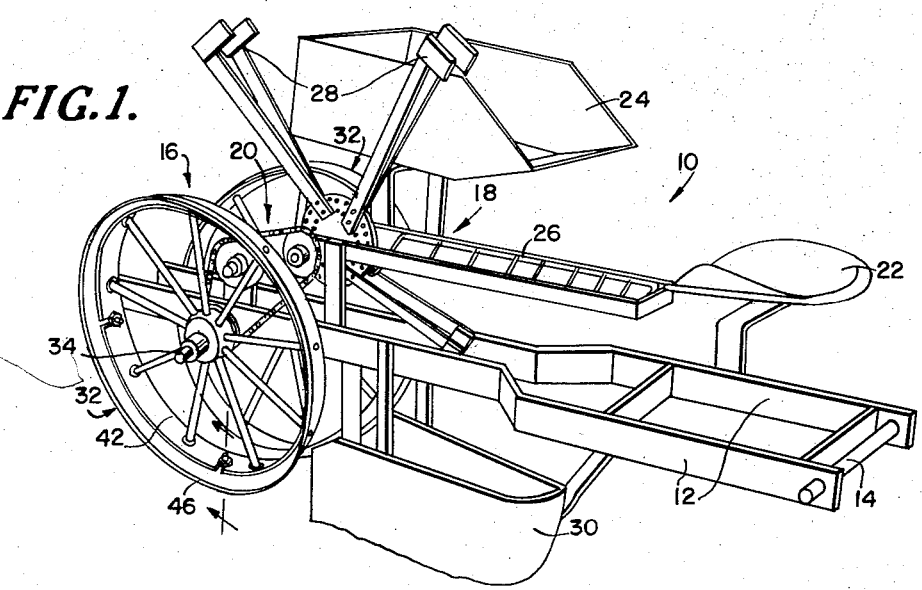
Figure 1 is a perspective view of a transplanter implement embodying the principles of the present invention.
Figure 2:
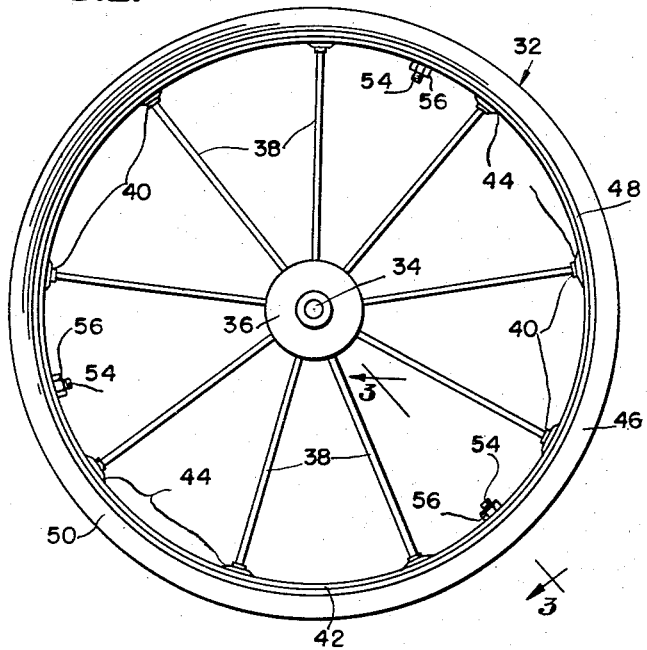
Figure 2 is a rear elevational view of a wheel of the implement.

Referring now more particularly to the drawings, there is shown in Figure 1 a transplanter implement, generally indicated at 10, to which the improvements embodying the principles of the present invention have been applied. In general, the implement is of conventional construction including a longitudinally extending frame 12 having a horizontal pin 14 extending transversely across the forward end thereof for pivotal connection with a tractor hitch or the like.

The frame is supported at its rear end by a wheel assembly, generally indicated at 16, with which the improvements of the present invention are more particularly concerned. The wheel assembly 16 serves to drive a conventional plant setting mechanism, generally indicated at 18, through any suitable means, such as a sprocket and chain unit 20 appropriately connected between the wheel assembly 16 and the plant setting mechanism 18. It is believed that a detailed description of the construction and operation of the plant setting mechanism is not essential to an understanding of the present invention. Suffice it to say, that the mechanism 18 is of the type in which an attendant stationed on a seat 22 carried by the frame feeds plants from a plant receiving box 24 on the frame to a plant feed tray 26 of the plant setting mechanism 18 from which they are transferred, as by spaced rotary plant hands 28, into the furrow formed by a row opener 30 secured in depending relation to the frame in advance of the wheel assembly 16.

The wheel assembly 16 includes a pair of wheels 32 journaled on shaft sections 34 rigidly mounted on and extending transversely downwardly and outwardly from the rear end of the frame. Each wheel 32 includes a hub member 36 having the inner ends of a plurality of equally spaced radially extending spokes 38 secured therein. Spaced inwardly from the outer end of each spoke is an annular shoulder 40 arranged to abut the interior surface of a cylindrical rim section 42. The rim section has a plurality of circumferentially spaced, apertured, radially inwardly extending, depressions 44, each receiving the end of a spoke extending outwardly from the associated shoulder with the latter in abutting engagement with the radially inwardly facing surface of the depression. The rim section 42 is secured to the spokes 38 and hub member 36 by deforming the outer extremity of the spokes over the outwardly facing surface of the depressions. It will be noted that the resulting structure provides the rim section 42 with an exterior ground engaging surface which is substantially smooth throughout or one which is free from any projections or the like.

Figure 3:
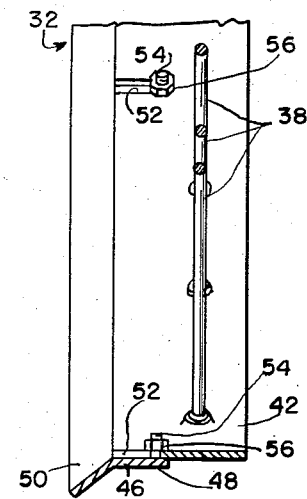
Figure 3 is an enlarged fragmentary cross-sectional view taken along the line 3—3 of Figure 2.

Mounted in cooperating telescoping relation to the rim section 42 is a flanged rim section 46. As best shown in Figure 3, the flange rim section 46 includes a cylindrical portion 48 having an interior diameter of a size to fit snugly over the cylindrical exterior surface of the rim section 42 and a flange portion 50 at its outer end extending outwardly therefrom at an angle of the order of 40°. Preferably, the axial extent of the cylindrical portion 48 is of the order of one-half the axial extent of the rim section 42. The width of the flange portion 50 is preferably substantially equal to the width or axial extent of the cylindrical portion.

The present invention contemplates the provision of means for maintaining the flanged rim section 46 in different positions of telescopic adjustment with respect to the cylindrical rim section 42 to accommodate different soil conditions encountered by the implement. To this end, a plurality of circumferentially spaced slots 52 is formed in the rim section 42, each slot extending axially inwardly from the outer end of the rim section a little over one-half the axial extent of the section. A plurality of corresponding circumferentially spaced studs 54 is mounted on the rim section, each stud being rigidly secured, as by welding or the like to the interior surface of the cylindrical portion of the section and extending radially inwardly thereof to be received by an associated slot. Each stud is exteriorly threaded to receive an interiorly threaded nut 56 which can be tightened into engagement with the interior surface of the cylindrical rim section surrounding the associated slot to thereby rigidly secure the flanged rim section to the cylindrical rim secction.

In operation, it will be understood that the wheel assembly 16 serves to support the rear end of the frame and the plant setting mechanism 18 mounted thereon. The wheels 32 of the assembly are disposed relative to each other and to the row opener 30, so as to pack the soil of the row into mound formation after the same has been opened and the plants are deposited therein. In addition, the rotation of the wheels 32 in contact with the ground serves to drive the plant setting mechanism so that the plants will be deposited in the opened row at even intervals.

Thus, in order to accomplish proper plant setting, the wheel assembly 16 must not sink into the soil contacted too much but yet, must apply sufficient pressure to the soil to insure adequate packing. In addition, the wheel assembly must maintain constant traction with the ground. The construction of the present wheel assembly insures that these conditions will be efficiently met in soils having widely variant characteristics. In general, the weight supported by the wheels remains relatively constant. The construction of the present wheel assembly enables this weight to be applied to the ground over varying contact areas so that the proper force per unit area or pressure can be applied in accordance with the conditions of the soil.

On very sandy soils, the approximately 200 pounds supported by the wheel assembly is best applied by a relatively wide setting of the telescopic rim sections wherein the studs 54 are secured adjacent the open ends of the slots 52. In this way, the force is distributed to the ground over a wider area and therefore excessive sinking in of the wheels is prevented and at the same time adequate packing is insured. On heavy soils, there is a tendency toward inadequate packing and loss of traction so that under these conditions, the rim sections are used with a narrow setting wherein the studs 54 are secured adjacent the closed ends of the slots 52. Again, the available force is most efficiently applied to insure adequate packing and sufficient traction, while preventing excessive sinking in.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claim.

I claim:

An implement supporting press wheel comprising: a hub member; a cylindrical ground engaging rim section rigidly mounted in concentric relation on said hub member; a flanged ground engaging rim section carried by said cylindrical rim section, said flanged rim section including a cylindrical portion mounted on the exterior surface of said cylindrical rim section in axial sliding contact therewith for movement between an extended position wherein said cylindrical portion extends substantially outwardly of said cylindrical rim section and a retracted position wherein said cylindrical portion is disposed in substantial overlapping relation with respect to said cylindrical rim section, and a flange portion extending outwardly from one end of said cylindrical portion beyond the associated end of said cylindrical rim section; said cylindrical rim section having a plurality of circumferentially spaced slots extending axially inwardly from said associated end thereof; a plurality of corresponding studs carried by said cylindrical portion and extending radially inwardly through said slots; and nuts threaded on said studs for securing said cylindrical portion to said cylindrical rim section in selected positions of adjustment between said extended and retracted positions.

References Cited in the file of this patent

UNITED STATES PATENTS

| | | |
|---|---|---|
| 304,399 | Babcock | Sept. 2, 1884 |
| 530,962 | Packham | Dec. 18, 1894 |
| 618,136 | Schofield | Jan. 24, 1899 |
| 827,587 | Warner | July 31, 1906 |
| 1,191,838 | Scharmann | July 18, 1916 |
| 1,715,841 | Johnson | June 4, 1929 |
| 2,687,683 | Chatlin | Aug. 31, 1954 |
| 2,729,157 | Webb | Jan. 3, 1956 |
| 2,751,959 | Blomquist | June 26, 1956 |